United States Patent [19]

Ezoe

[11] 4,071,109

[45] Jan. 31, 1978

[54] POWER STEERING CONTROL WITH DAMPING ACTION AGAINST RAPID CHANGE IN VEHICLE SPEED

[75] Inventor: Mitsuhiko Ezoe, Yokosuka, Japan

[73] Assignee: Nissan Motor Co., Ltd., Japan

[21] Appl. No.: 706,377

[22] Filed: July 19, 1976

[30] Foreign Application Priority Data

July 17, 1975  Japan ................................. 50-86651

[51] Int. Cl.² ............................................ B62D 5/08
[52] U.S. Cl. .................................... 180/143; 361/236
[58] Field of Search .......... 180/143, 140, 142, 105 E; 317/5

[56] References Cited

U.S. PATENT DOCUMENTS

| 3,693,747 | 9/1972 | Nishikawa | 180/143 |
| 3,694,039 | 9/1972 | Kawabe | 180/105 E |

*Primary Examiner*—Joseph F. Peters, Jr.
*Assistant Examiner*—John A. Pekar
*Attorney, Agent, or Firm*—Lowe, King, Price & Markva

[57] ABSTRACT

A control circuit for power steering units of automotive vehicles comprises a wheel speed sensor generating an electrical signal representative of the wheel speed and an RC timing circuit for charging the signal and discharging the stored electrical signal in response to rapid changes in wheel speed. The voltage developed in the RC circuit is coupled to an amplifier through a field-effect transistor to generate an energization current that drives a control valve which in turn regulates the pressure of the working fluid to the power steering unit.

6 Claims, 3 Drawing Figures

POWER STEERING CONTROL WITH DAMPING ACTION AGAINST RAPID CHANGE IN VEHICLE SPEED

The present invention relates generally to power steering systems for automotive vehicles, and in particular to a power steering control circuit incorporating a timing circuit to provide a damper action against sudden changes in wheel speed.

The known power steering system of an automotive vehicle is provided with a feature that permits the working fluid of the power steering unit to be regulated in response to the vehicle speed so that the thrust on the steering shaft may be increasingly relieved with the decrease in vehicle speed while the driver may feel the road at higher speeds.

Since the vehicle speed can be represented by the speed of rotation of a wheel under normal cruising conditions, the prior art power steering control circuit employs a wheel speed sensor to generate a wheel-speed representative signal to control the working fluid pressure in response thereto. However, under vehicle deceleration, a heavy braking effort would lock the wheels and as a result the sensor generates a false speed signal. The working fluid pressure will then increase abruptly in response to the false signal and the thrust on the steering shaft is relieved in a stepwise manner at high vehicle speeds. The driver will lose the feeling of the road to the point of danger.

An object of the present invention is therefore to provide an improved power steering control circuit which ensures against the prior art disadvantages by providing a damping action when wheel speed is rapidly changed.

Another object of the invention is to provide an improved power steering control circuit which comprises a wheel speed sensor generating an electrical signal representative of the speed of rotation of the vehicle wheels and an RC timing circuit for charging the electrical signal and discharging the stored signal, the time constant value of the RC circuit being such that the voltage delivered therefrom varies at a rate much lower than the rate at which the electrical signal varies in amplitude upon vehicle acceleration or deceleration for regulating the working fluid pressure of the power steering unit.

These and other objects and advantages of the present invention will be understood from the following description taken in conjunction with the accompanying drawings, in which.

Figure 1:
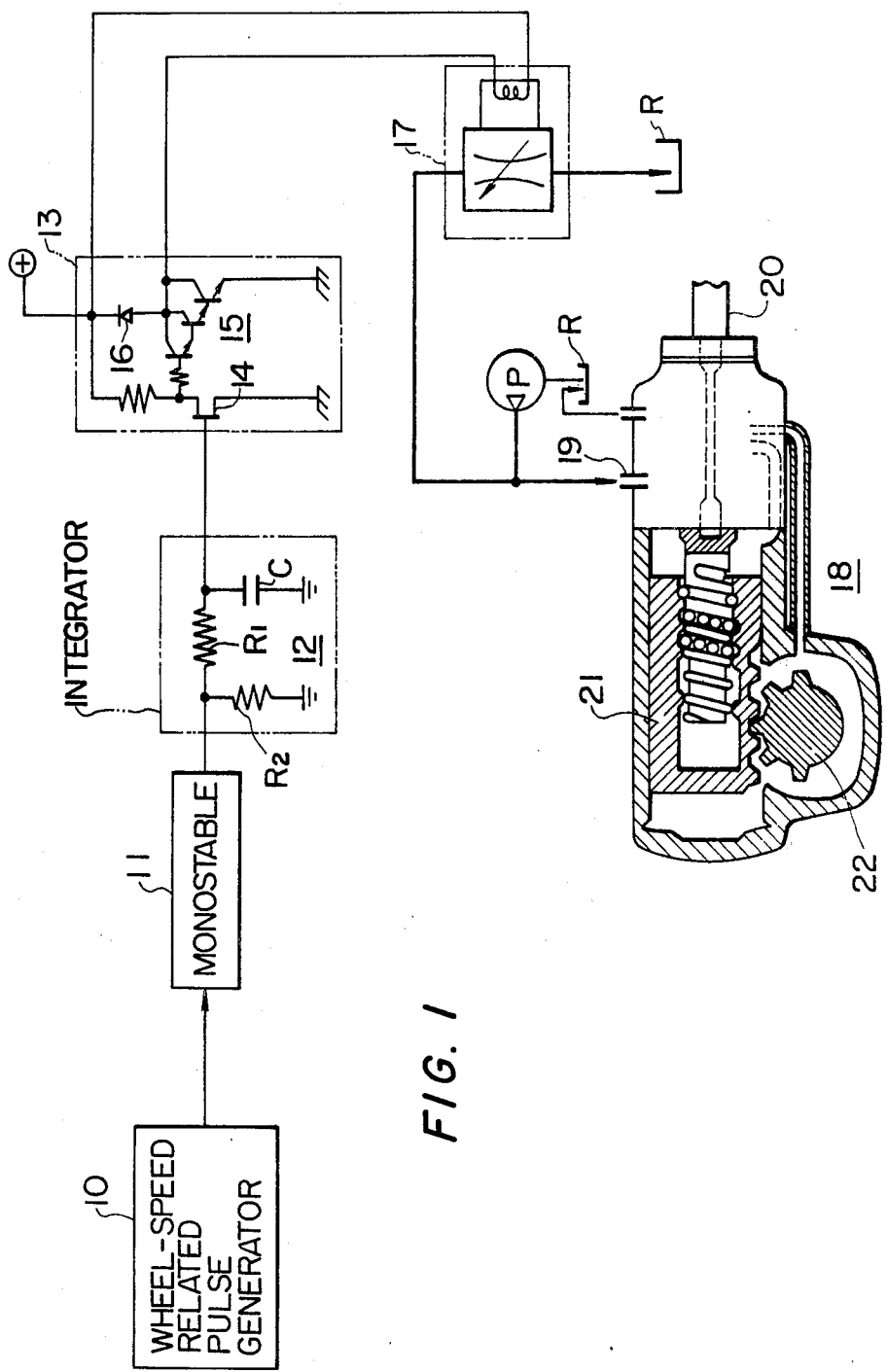
FIG. 1 is an embodiment of the present invention illustrating a connection with a conventional integral type power steering unit.

Referring now to FIG. 1, a power steering control circuit for an automotive vehicle in accordance with the present invention comprises a wheel-speed related pulse generator 10 of any known type which generates electrical pulses the number of which per unit time represents the speed of rotation of the vehicle wheels. A monostable multivibrator 11 is connected to the output of the pulse generator 10. Since the width of the pulse from the generator 10 has no fixed time duration depending on the speed of the wheel, the monostable 11 converts the input signal into constant-duration pulses.

An integrating circuit 12 is connected to the monostable multivubratir 11, This integrator circuit is an RC timing circuit having a resistor $R_1$ connected to the output of monostable 11, an integrating capacitor C connected between the resistor $R_1$ and ground, and a resistor $R_2$ connected between the output of monostable 11 and ground. The resistor $R_1$ serves as a charging path to allow capacitor C to be charged with the pulse from monostable 11 and the resistor $R_2$ serves as a discharging path to discharge the electrical energy stored in the capacitor through resistors $R_1$ and $R_2$ to ground. The juncture between the resistor $R_1$ and capacitor C serves as an output of the integrator 12 and is connected to the control gate of a field-effect transistor 14 of a drive amplifier or valve energization circuit 13. A Darlington amplifier 15 is connected to the source electrode of the field-effect transistor to provide an energization current required to drive the electromagnetic coil of a known proportioning control valve 17 which is connected between the voltage source and the common collectors of the Darlington amplifier 15. A diode 16 is connected across the coil winding to pass the current caused by the counterelectromotive force generated in the winding.

An engine-driven pump P with a reservoir R acts as a power source to supply working fluid to a power steering unit 18. The pump P delivers hydraulic fluid oil under a working pressure to the power steering unit 18 of integral type through an inlet port 19 and also to reservoir R through control valve 17. The steering shaft 20 carries a valve spool (not shown) that moves axially to perform its controlling function of metering high pressure oil. The rotation of the steering shaft shifts the valve down and the valve admits high-pressure oil to one side of the actuator piston 21 and allows oil from the adjacent side to return to the reservoir. The gear sector 22 moves the rest of the power steering system in the corresponding direction to relieve the thrust on the steering shaft 20.

Under normal driving conditions, the pulse generator 10 generates wheel-speed related pulses which are also related to the vehicle speed relative to the road. Capacitor C is charged during the period of the constant duration pulses and develops a voltage representative of the wheel speed. The time constant of resistor $R_1$ and capacitor C is selected at a value larger than the minimum interval between successive ones of the constant duration pulses. With the shorter pulse interval, the capacitor C builds up charge, while with the longer pulse interval the capacitor tends to discharge its stored energy to decrease the stored charge. Therefore, the output from the integrator 12 is a voltage representing the instantaneous frequency of the pulse generator 10, and hence the wheel speed. After amplification by amplifier 13, wheel-speed representative signal energizes the proportioning control valve 17 which regulates the working pressure of oil supplied to the steering unit 18 by draining off to the reservoir, so that the working pressure is controlled inversely proportional to the wheel speed and the trust on the steering shaft 20 is relieved less at high vehicle speeds to permit the vehicle driver to feel the road than at lower vehicle speeds.

A sudden application of brake would often lock the wheels and the number of generated pulses does not represent the actual vehicle speed. Under these conditions, the integrator 12 will have the effect of holding the voltage across the capacitor C while allowing it to discharge through resistors $R_1$ and $R_2$ to ground. Therefore, the energization current supplied to valve 17 will gradually decrease at a rate determined by the time constant value of resistors $R_1$, $R_2$ and capacitor C, which may be selected at a value in a range from 0.5 to 1 second. Because of this electrical damping action, the thrust upon the steering shaft 20 will not be relieved abruptly under sudden deceleration.

The high input impedance of the gate-to-drain path of the field-effect transistor 14 has no influence on the rate of charge and discharge through capacitor C and thus serves as a buffer between the integrator 12 and the Darlington amplifier 15.

The integrator 12 also provides a damping action to the thrust on the steering shaft during vehicle acceleration. If a sudden vehicle acceleration produces a slip against the road surface resulting in a high vehicle speed, the number of pulses from the generator 10 will sharply increase, not representing the actual vehicle speed. Under these conditions the integrator 12 will have the effect of holding the voltage across the capacitor C by charging it through resistor $R_1$. Therefore, the time constant value of resistor $R_1$ and C should also lie within the range from 0.5 to 1 second. The energization current will then increase at a rate determined by the time constant value of $C.R._1$.

It will be understood that the monostable multivibrator 11 may be replaced with a frequency-to-voltage converter as will be described later since the integrator 12 is capable of acting as a damper against the sudden change of the wheel-speed representative voltage.

Figure 2:
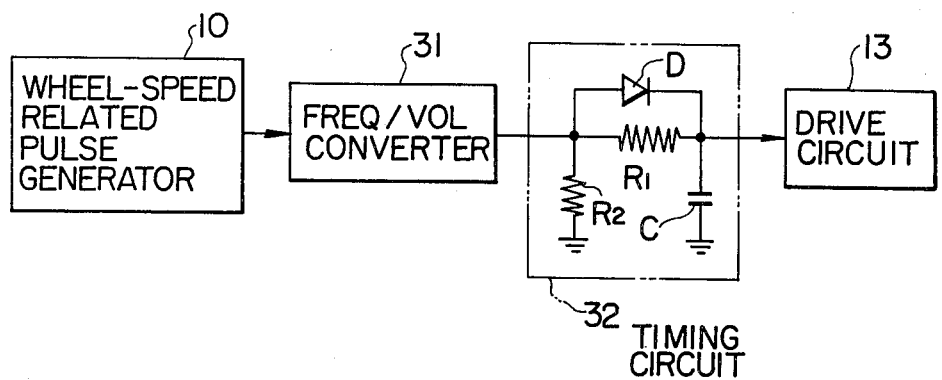
FIG. 2 is a modification of the embodiment of FIG. 1.

A modification of the invention is shown in FIG. 2 in which a frequency-to-voltage converter 31 is connected to the wheel-speed related pulse generator 10 to convert the pulses into a voltage signal representative of the wheel speed. To the converter 31 is connected an RC timing circuit 32 of a similar circuit configuration to that shown in FIG. 1 with the exception that a diode D is connected in parallel to the resistor $R_1$ to charge capacitor C as long as it is forwardly biased by the increasing voltage at the output of converter 31. The voltage across the capacitor C will keep track of the input voltage waveform. A decrease in the input voltage backwardly biases the diode D and the charge stored on capacitor C will be discharged through resistors $R_1$ and $R_2$.

With the wheels being locked upon application of brake, the input voltage will sharply drop as described in the previous embodiment. The timing circuit serves as a damper against the sudden change in wheel speed by discharging the energy stored on capacitor C at a rate lower than the rate at which the input voltage changes.

Figure 3:
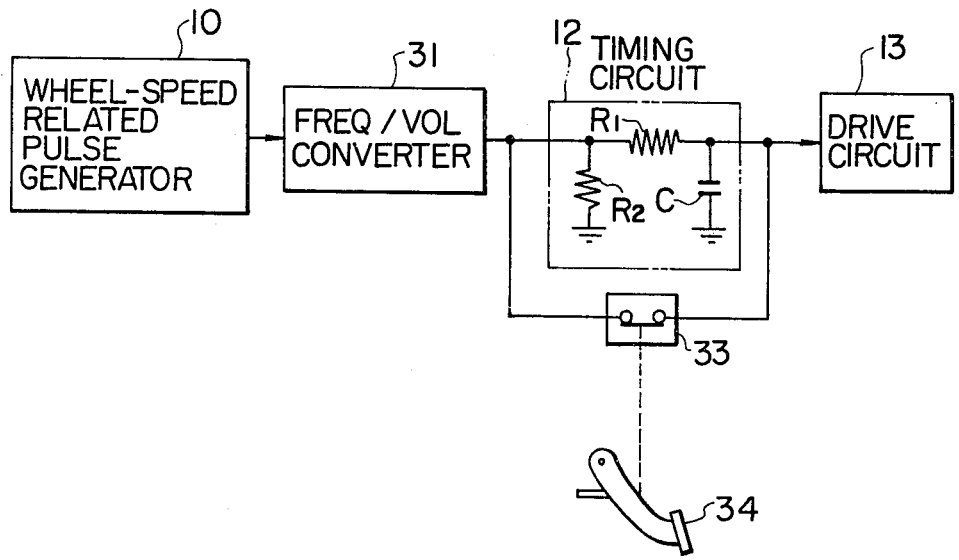
FIG. 3 is an alternative embodiment of FIG. 2.

In FIG. 3, a switch 33 is provided having a normally closed contacts connected across the input and output of the timing circuit 12. The switch 33 is operatively connected to a brake pedal 34 to open its contacts when the brake is applied. Switch 33 normally couples the output from the converter 31 to the capacitor C to allow it to be charged up to the input voltage. When brake 34 is applied the switch is opened to allow the energy stored on capacitor C to be discharged through resistors $R_1$ and $R_2$ to ground, so that the capacitor has the effect of holding the voltage applied to the drive circuit 13 while it discharges its stored energy.

What is claimed is:

1. In a wheeled vehicle hydraulic power steering system including a source of pressurized working fluid and a power steering unit supplied with said working fluid to give increased power to steering operation, a control apparatus for preventing a sudden relief of thrust on a steering shaft in response to sudden acceleration or deceleration of the vehicle, comprising:
   means for generating an electrical signal of which the magnitude is representative of the speed of rotation of the vehicle wheels;
   a timing circuit having a capacitor, a charge circuit for charging the capacitor with said electrical signal, and a discharge circuit for discharging the energy stored in said capacitor when said signal falls below the voltage developed across said capacitor, the time constant values of said charge and discharge circuits being such that the voltage developed across said capacitor varies at a rate lower than the minimum rate at which the speed of said vehicle wheels varies in response to sudden acceleration and deceleration of the vehicle;
   an electromagnetically operated control valve for regulating the flow of said working fluid supplied to the power steering unit in response to an electric current supplied thereto; and
   amplifier means including a field-effect transistor having a control gate connected to said capacitor for providing amplification of said voltage developed across said capacitor and a current amplifier connected to said field-effect transistor for providing an electric current in response to said amplified voltage to operate said control valve.

2. In a wheeled vehicle hydraulic power steering system including a source of pressurized working fluid and a power steering unit supplied with said working fluid to give increased power to steering operation, a control apparatus for preventing a sudden relief of thrust on a steering shaft when a wheel brake is applied, comprising:
   means for generating an electrical signal of which the magnitude is representative of the speed of rotation of the vehicle wheels;
   a timing circuit including a capacitor, a charge circuit for charging the capacitor with said electrical signal and a discharge circuit for discharging the energy stored in said capacitor when said signal falls below the voltage developed across said capacitor, the time constant value of said discharge circuit being such that the voltage developed across said capacitor decreases at a rate lower than the minimum rate at which the speed of rotation of said wheels decrease upon the application of the brake to said wheels;
   an electromagnetically operated control valve for regulating the flow of said working fluid supplied to the power steering unit in response to an electric current supplied thereto; and
   amplifier means including a field-effect transistor having a control gate connected to said capacitor for providing amplification of said voltage developed across said capacitor and a current amplifier connected to said field-effect transistor for providing an electric current in response to said amplified voltage to operate said control valve.

3. The system as claimed in claim 2, wherein said charge circuit comprises a diode connected between the output of said signal generating means and said capacitor poled in a sense to charge said capacitor with said output, and said discharge circuit comprises a first resistance path connected in parallel to the diode and a second resistance path connected to the first resistance path and said capacitor to form a closed discharge circuit loop.

4. A control apparatus as claimed in claim 2 wherein said charge circuit comprises a switch having normally closed contacts operable to open when the brake is applied to said wheels, said contacts being connected in series between the output of the signal generating means and said capacitor, and said discharge circuit comprises a resistor connected in parallel to said capacitor.

5. The system as claimed in claim 2, further comprising a reservoir for holding said working fluid, a first conduit communicating said source of pressurized working fluid to said reservoir through said power steering unit, a second conduit communicating said source to said reservoir through said control valve so that said working fluid in said second conduit bypasses said first conduit.

6. The system as claimed in claim 2, wherein said signal generating means comprises a wheel speed sensor for generating a train of pulses of which the repetition frequency is proportional to the speed of the vehicle wheels, and a monostable multivibrator responsive to said pulses for generating a train of pulses with a constant duration.

* * * * *